United States Patent Office 3,406,620
Patented Oct. 22, 1968

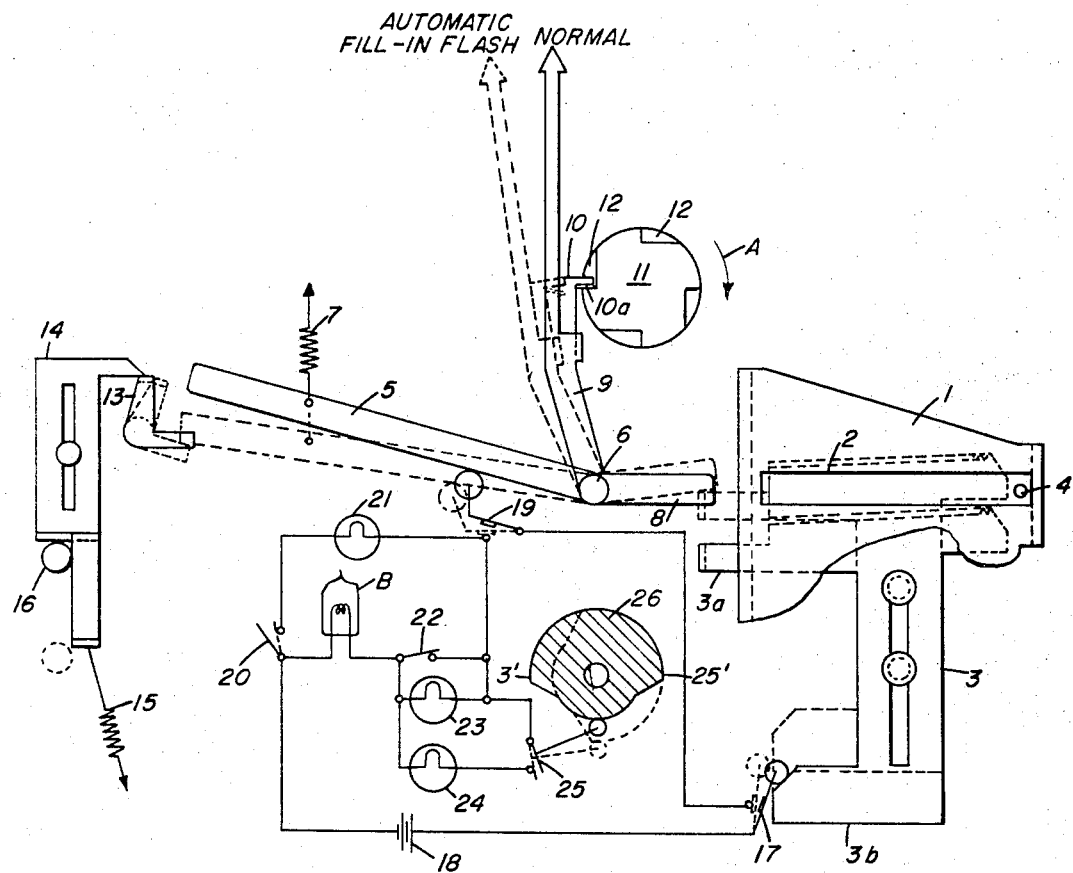

3,406,620
AUTOMATIC CONTROL FOR DAYLIGHT OR FLASH OPERATION OF A CAMERA
William T. Hochreiter, Ronald S. Kareken, and David E. Beach, Rochester, N.Y., assignors to Eastman Kodak Company, Rochester, N.Y., a corporation of New Jersey
Filed July 19, 1965, Ser. No. 473,096
17 Claims. (Cl. 95—10)

ABSTRACT OF THE DISCLOSURE

Automatic flash control for a camera of the type employing an indexable multilamp flash unit and a light measuring system. The control apparatus includes a lock preventing indexing of the flash unit and a normally open switch in the flash circuit. When scene illumination is below a predetermined level the lock automatically disengages and the switch closes, thus allowing a flash lamp to be fired and the flash unit to be indexed. Manual override means are provided to allow for use of fill-in flash.

---

The present invention relates to photographic cameras, and more particularly to a mechanism that would automatically change an automatic exposure control camera to its flash mode of operation whenever scene illumination falls below a certain level.

Various devices have been proposed in the past for changing a camera from its daylight mode of operation in accordance with the lighting conditions encountered. In certain of these devices, means have been provided whereby manual depression of the camera body release actuates a signal mechanism indicating to the operator that a flash bulb is or is not needed for additional illumination. If additional illumination is needed, the operator must waste valuable picture taking seconds inserting a flash bulb in the camera if he has not already done so. On the other hand, if flash is not called for, he must remove the bulb to prevent inadvertent actuation thereof.

Other systems for use with cameras of the type adapted to receive a single flashbulb have been proposed which would automatically actuate the flash if given conditions call for such actuation. In devices of this type, additional adjustments of the diaphragm and shutter mechanisms are often necessary.

With the increased use of cameras employing rotatable flash units of the type, for example, found in copending Kottler et al. U.S. application Ser. No. 417,914, now Patent No. 3,327,105, filed Dec. 14, 1964, an additional complication resides in the fact that it is desirable to prevent rotation and actuation of such units unless conditions so warrant.

It is therefore an object of this invention to provide a reliable means for use with photographic cameras which automatically changes and automatically sets the automatic exposure control of the camera to either its flash mode or daylight mode of operation which is of simple, rugged construction.

It is a further object to provide an automatic control for daylight or flash operation which is adapted for use with a rotatable flash assembly to either prevent rotation and actuation thereof or allow same in accordance with the scene illumination encountered.

These objectives have been attained in the present invention by providing an automatic control mechanism for photographic cameras adapted for use with a rotatable flash unit which (1) prevents rotation an actuation of such unit when daylight conditions are encountered and (2) allows rotation and actuation thereof, as well as effecting appropriate adjustments in the camera exposure control mechanism, when scene light drops below a predetermined level.

Other objects of the invention will appear from the following description, reference being made to the accompanying drawings, wherein:

The figure is a simplified schematic view of the basic elements of the entire automatic control mechanism.

Referring now to the figure, a typical camera embodying the invention is shown having a mounting plate 1 with a slot 2 therein. Mounting plate 1 is attached in any suitable manner to the camera housing (not shown). A moving needle 4 of a galvanometric device (not shown) which is part of the camera's conventional photoresponsive circuitry protrudes through slot 2 and is positioned as a function of scene brightness. Disposed behind mounting plate 1 is a meter clamping slide 3 which is mounted for movement on the camera housing (not shown) in any suitable manner. A meter clamping slide of this type is shown in copending U.S. patent application Ser. No. 437,221, now Patent No. 3,374,718, William T. Hochreiter, filed Mar. 4, 1965. As is more fully disclosed in the aforesaid Hochreiter application, the clamping slide is operatively associated with the camera body release and is adapted to move upwardly into clamping engagement with the needle upon actuation thereof by the operator. The meter clamping slide at its clamping surface is of less width than slot 2. When there is sufficient illumination for a daylight type of exposure the needle is positioned in the left or intermediate portions of slot 2 (as viewed in the figure) and is adapted to be clamped against the upper surface of plate 1 defining slot 2 by the meter clamping slide 3. When, however, the needle is in the position illustrated in the figure, which represents a low light condition requiring supplemental illumination, the meter clamping slide, due to its decreased width, bypasses the needle and travels beyond its normal clamping position.

Integrally attached to meter clamping slide 3 is an upper extension element 3a. On the lowermost portion of meter clamping slide 3 is a lower extension element 3b which is in parallel relationship to upper extension element 3a.

A mode lever 5 is pivotally mounted on the camera housing (not shown) for a purpose to be more fully brought out below. Mode lever 5 pivots about peg 6 and is biased in a clockwise direction by spring 7. Integrally attached to mode lever 5 is a protrusion 8 which is in the path of movement of upper extension 3a and is adapted to be engaged thereby upon upward movement thereof. Also integrally attached to mode lever 5 and mounted for movement therewith is control lever 9. The upper portion of control lever 9 is in the shape of an arrow and serves as an indicator with respect to suitable indicia disposed on the camera housing (not shown) in such a manner as to be readily visible to the operator. An abutment member 10 extends from one side of control lever 9. For reasons which will more fully be brought out below a flat spring element 10a is disposed immediately adjacent said abutment member. The flat spring element is attached on one end thereof to control lever 9. The free end of the flat spring element is normally biased away from abutment member 10 and may most clearly be seen in that condition in the position indicated in phantom.

Disposed adjacent control level 9 is socket cam 11 having a series of notches 12 therein which cooperate with abutment member 10 and flat spring element 10a in a manner which will be more fully brought out below. The function of a socket cam of this nature is more fully brought out in copending U.S. application Ser. No. 458,016, now Patent No. 3,353,468, D. E. Beach, filed May 24, 1965. Briefly, socket cam 11 is operatively associated with a rotatable socket assembly adapted to receive a multilamp flash attachment. The socket cam 11 provides an intermediate link between a slip clutch mechanism and the socket assembly. Therefore, when the socket cam 11 is locked against movement in the direction of arrow A, the socket assembly and hence the multilamp flash attachment also do not move. When in this locked position the slip clutch elements merely slip with respect to one another. When, however, the socket cam 11 is free to move, the rotatable socket assembly and associated multilamp unit move to a like degree. As stated above, the aforementioned U.S. application Ser. No. 458,016 may be consulted for particular details of the drive mechanism and its inter-relationship with the socket cam and rotatable socket assembly.

Pivotally mounted adjacent the elongated portion of mode lever 5 is a latch element 13 positioned in the path of movement of said elongated portion. Latch element 13, in the position illustrated in solid lines, cooperates with a flash control slide 14 mounted for reciprocable motion on the camera housing. Flash control slide 14 is biased in a downward direction, as viewed in the figure, by coil spring 15. A shutter release element 16 is disposed below a portion of flash control slide 14. Flash control slide 14, when unlached, is free to follow the shutter release element in a downward direction and set the shutter speed at $\frac{1}{30}$ of a second and establish the lens aperture based on the distance focused as described in U.S. Patent No. 3,175,479, issued May 30, 1965, for Flash Conditions.

A body release switch 17, which is part of the camera flash circuit, is positioned adjacent lower extension element 3b of the meter clamping slide. The body release switch is in normally open position and is closed immediately upon upward movement of meter clamping slide 3. Body release switch 17 is in series with battery 18 and serves, for example, to close the circuit to a flash ready indicator bulb 23 whenever switch 19 is closed either automatically or manually (to be described hereinafter). Mode lever switch 19 is also normally in open position. Switch 19, however, is adapted to be closed only upon counterclockwise rotation of mode lever 5, which occurs only under low light conditions (when needle 4 is in the position illustrated in the figure) or when the automatic control is manually overridden (to be described hereinafter).

Additionally disposed in series with battery 18 is flash mode switch 20 and indicator lamp 21. Also illustrated in the flash circuit is a flash lamp B, which corresponds to the flash bulb element of the rotatable flash assembly, as disclosed in aforementioned U.S. application Ser. No. 458,016, which is disposed in firing position. In series with bulb B is shutter switch 22. Two additional indicator bulbs 23 and 24 are also disposed in the flash circuit. Indicator bulb 23 when lit indicates to the operator that the flash is ready. Indicator bulb 24 when lit serves to indicate to the operator that the subject of the proposed photograph is not within the acceptable flash range. Actuation of this bulb takes place upon closing of range switch 25 which is normally biased open and is positioned upon rotation of range cam 26. Range cam 26 is connected in any desirable fashion to the camera focusing mechanism for rotation upon adjustment thereof. In the device illustrated, the distance between three feet and twenty-five feet is considered the acceptable distance range for flash operation, as indicated by suitable indicia outlining these limits on the range cam. The position of such indicia is indicated by reference numerals 3' and 25'. When the cam is in the position indicated in solid lines the switch 25 is open. As the cam rotates in response to the focusing mechanism to the position indicated in phantom, the range is no longer acceptable and switch 25 is closed, thus lighting indicator lamp 24.

The operation of the above mechanism will now be described. For purposes of clarifying such description it will first be assumed that the needle 4 is in a position corresponding to daylight conditions when supplemental illumination is not required, i.e., in a position where it may be clamped by meter clamping slide 3 upon upward movement thereof. In such a case, as the camera body release (not shown) is depressed, the meter clamping slide will commence upward movement through any suitable linkage such as that shown for example in U.S. Patent No. 3,125,939, Bundschuh et al., issued Mar. 24, 1964. The meter clamping slide will continue upward movement until it traps needle 4 against the upper surface of slot 2. This upward movement will be insufficient to pivot mode lever 5. Abutment member 10 will then remain in engagement with a notch 12; flash control slide 14 will remain in its upper position; and mode lever switch 19 will remain open. As described in the aforementioned U.S. Patent 3,125,939, the camera body release is free to continue its downward movement in spite of the fact that upward movement of the meter clamping slide has been halted. Continued downward movement of the body release will trip the shutter which in turn closes shutter switch 22 through any known expedient. Bulb B, however, fails to fire because the flash circuit remains open due to the fact that mode lever switch 19 remains open and the circuit is not completed. After the picture is taken, the film is wound in any suitable manner which, as is described in previously mentioned U.S. patent application Ser. No. 458,016, normally rotates the rotatable socket assembly and associated multilamp unit. Since, however, socket cam 11 is held against movement in the direction of arrow A by the interengagement of abutment member 10, the socket assembly is also held in position and the clutch elements of the slip clutch mechanism, also described in U.S. patent application Ser. No. 458,016, slip relative to one another. In this manner, the film is wound but the multilamp unit remains stationary.

When, however, the needle 4 is in the position illustrated in the figure, which indicates that the scene illumination is below the daylight capability of the camera, slide 3 will miss the needle upon upward movement thereof upon depression of the camera body release. Meter clamping slide will then move to the position illustrated in phantom in the figure. This additional movement which occurs only under low light conditions, rotates mode lever 5 to the position illustrated in phantom. Rotation of mode lever 5 closes mode lever switch 19, withdraws abutment 10 from notch 12, and rotates latch element 13 in a clockwise direction. As previously described, flash control slide 14 is then drawn downwardly under the bias of coil spring 15 thereby setting the shutter speed at $\frac{1}{30}$ second and establishing the lens aperture based on the distance focused as described in U.S. Patent 3,175,479.

Whenever there is a flash cube in the camera, flash mode switch 20 is open through any suitable linkage and cube sensing means (not shown). If the multilamp assembly has a good bulb B in the firing position of the socket, the circuit will be completed through battery 18 and the "Flash Ready" lamp 23 will be visible in the camera viewfinder when the camera body release (not shown) is depressed while taking a picture requiring flash. Further downward movement of the body release trips the shutter closing shutter switch 22 through any desirable linkage (not shown) thereby firing bulb B.

When the camera body release is allowed to return to its normal position, slide 3 moves downward opening body release switch 17 and allowing lever 5 to rotate clockwise under the urging of spring 7. Because of the free end of flat spring 10a, abutment member 10 cannot reenter the notch 12 from which it was previously withdrawn. Socket cam 11 is then free to rotate 90° to the next bulb position as the film is advanced for the next exposure in the manner previously described. When the next notch presents itself, abutment 10 and flat spring 10a enter it and the lever 5 returns to the position it assumed at the beginning of the picture-taking operation. Mode lever switch 19 then opens and latch 13 under suitable spring means returns to its original position to once again latch flash control slide 14 in its original position, flash control slide 14 having been previously returned to such position by any desired expedient. The mechanism is then set for the next exposure by either daylight or flash.

Although this system is designed to work with a multilamp flash assembly always in place, the photographer may not wish to keep such an assembly in his camera at all times. In this case a warning "Use Flash" signal from indicator lamp 21 would automatically appear in the viewfinder whenever the scene illumination falls below the minimum daylight capability of the camera. Upward movement of meter clamping slide 3 will close body release switch 17 in the manner previously disclosed. If the meter needle is in the low light position shown, mode lever switch 19 will also close due to the extra motion of slide 3 and the resultant rotation of mode lever 5. Since there is no flash unit in the camera in this instance, flash mode switch 20 will be closed and the "Use Flash" bulb 21 will come on. The photographer will then put a multilamp flash assembly in the socket to take the picture. Flash mode switch 20 then opens and the "Use Flash" signal would go out.

Because the flashing of the rotatable multilamp assembly is controlled automatically by the scene illumination, it is necessary with this system to have a manual override which the customer may set for the purpose of taking fill-in flash pictures. This setting would return to a normal position after such a picture has been taken. This feature is accomplished by merely providing a means by which mode lever 5 may be manually shifted counterclockwise to its flash position. The "Use Flash" signal bulb 21 would come on in the manner previously described if a flash unit is not in place to indicate this fact to the operator.

Although only one specific embodiment of the present invention is disclosed herein, it should be understood that the particular form disclosed has been selected to facilitate explanation of the invention rather than to limit the number of forms which it may assume. Further, it should be understood that various modifications, alterations, and adaptations may be applied to this specific form described to meet the requirements of practice without in any manner departing from the spirit or scope of the present invention.

What is claimed is:

1. In a camera of the type having an indexable multilamp flash unit, the combination comprising:
   a member operatively associated with said flash unit and adapted for indexing therewith;
   a movable element whose position along a predetermined path of movement is a function of scene brightness;
   locking means movable from a first position to a second position;
   said locking means when in said first position preventing the indexing of said member and in said second position permitting the indexing of said member;
   sensing means for sensing the position of said movable element and for moving said locking means from said first position to said second position when said movable element is in a position corresponding to low scene light.

2. The combination according to claim 1, wherein said movable element is a needle of a galvanometric device and wherein said sensing means is a clamp adapted for engagement with said needle when said needle is in a position corresponding to scene illumination within the daylight capabilities of said camera.

3. The combination according to claim 1 wherein said locking means is biased toward said first position by biasing means.

4. The combination according to claim 1 wherein said member is a rotatable element having a plurality of notches therein and wherein said locking means is selectively engageable with said notches.

5. The combination according to claim 4 wherein said locking means has an abutment element for selectively entering into at least one of said notches when said locking means is in said first position;
   means for preventing reentry of said abutment member into said at least one of said notches until said rotatable element has indexed.

6. The combination according to claim 1 including a shutter setting member biased from a first position to a second position; and
   latch means for retaining said shutter setting member in said first position and responsive to movement of said locking means to said second position to unlatch said shutter setting member to permit movement thereof to said second position.

7. The combination according to claim 1, wherein a flash circuit is provided for actuating said flash unit, said flash circuit having a switch therein in a normally open position; said locking means when in said second position closing said switch.

8. In a camera having a minimum daylight capability, the combination comprising:
   first means for sensing scene light illumination;
   a shutter setting member movable from a first position to a second position, said shutter setting member when in said second position setting said shutter speed for flesh performance;
   second means responsive to the sensing of said first means of scene light conditions below the minimum daylight capability of said camera for moving said shutter setting member to said second position;
   latch means adapted to retain said shutter setting member in said first position; and
   said second means withdrawing said latch means from said shutter setting member when said first means senses scene light conditions below the minimum daylight capability of said camera.

9. The combination according to claim 8 wherein said second means includes a pivoted lever which engages said latch to withdraw it from engagement with said shutter setting member.

10. In a camera of the type adapted to receive a multilamp flash unit and including means for sensing changes in scene brightness and means for indexing a received multilamp flash unit, the combination therewith of:
    means operatively associated with said indexing and sensing means for preventing said indexing of a received flash unit in response to a sensing by said sensing means of scene brightness above a predetermined value.

11. In a camera having means for receiving a flash lamp unit and means for moving a received flash lamp unit, the improvement comprising:
    (a) means responsive to scene brightness for producing an output indicative of scene brightness; and
    (b) means, operatively associated with said moving means and said output producing means, for preventing movement of said moving means in response to an output from said output means indicating brightness above a predetermined level.

12. In a camera of the type adapted to receive a multilamp flash unit and including means for measuring scene brightness, means for rotating a received multilamp flash unit to index the unit and means for firing a flash lamp in a received flash unit, the combination therewith of:
    means for preventing rotation of a received flash unit when scene brightness is above a predetermined value;
    means for preventing the firing of a flash lamp in a received unit when scene brightness is above said predetermined value; and
    manual override means for inactivating said rotation preventing means and said firing preventing means for providing fill-in flash when scene brightness is above said predetermined value.

13. In combination with a camera of the type adapted to receive and fire a flash unit and including means for moving a received flash unit and means for measuring values of scene brightness, the improvement comprising:
 means for sensing a value of scene brightness above a predetermined level; and
 means, operatively associated with said sensing means and said moving means, responsive to a sensing of scene brightness above said predetermined level by said sensing means for preventing movement of said moving means.

14. The invention defined in claim 13 further comprising:
 means for firing a received flash unit; and
 means, operatively associated with said sensing means and said firing means, responsive to a sensing of scene brightness above said predetermined level by said sensing means for preventing firing of a received flash unit.

15. A camera adapted to receive and index a multilamp flash unit comprising:
 a rotatable socket assembly for receiving a flash unit and for rotation therewith;
 a member coupled to said socket assembly for rotation therewith;
 scene brightness measuring means for producing an output indicative of scene brightness;
 locking means for said member, said locking means having a first condition preventing rotation of said member and of said socket assembly and a second condition permitting rotation of said member and of said socket assembly;
 means coupling said scene brightness measuring means to said locking means for changing said locking means from said first condition to said second condition when said output indicates that scene brightness is below a predetermined value;
 flash lamp firing means having an operative and an inoperative condition; and
 means coupling said scene brightness measuring means to said firing means for changing said firing means from said inoperative condition to said operative condition when said output indicates that scene brightness is below said predetermined value.

16. The apparatus according to claim 15 including:
 manual override means for placing said locking means in its second condition and for placing said firing means in its operative condition whereby said camera can be operated in its flash mode of operation even though said output indicates that scene brightness is above said predetermined value.

17. The apparatus according to claim 15 including:
 a shutter setting member biased from a first position to a second position;
 means for retaining said shutter setting member in said first position when scene brightness is above said predetermined level; and
 means for moving said shutter setting member to said second position when scene brightness is below said predetermined level.

References Cited

UNITED STATES PATENTS

| | | | |
|---|---|---|---|
| 3,125,939 | 3/1964 | Bundschuh et al. | 95—10 |
| 3,127,824 | 4/1964 | Williams | 95—11 XR |
| 3,250,193 | 5/1966 | Horton | 95—10 |
| 3,269,795 | 8/1966 | Floden | 240—37.1 XR |
| 3,263,068 | 7/1966 | Jakob | 240—1.3 |
| 3,353,467 | 11/1967 | Ernisse et al. | 95—11.5 |

NORTON ANSHER, *Primary Examiner.*

FRED L. BRAUN, *Assistant Examiner.*